United States Patent
Owens

(10) Patent No.: US 8,344,534 B2
(45) Date of Patent: Jan. 1, 2013

(54) SYSTEM FOR A VEHICLE TO CAPTURE ENERGY FROM ENVIRONMENTAL AIR MOVEMENT

(76) Inventor: Andrew J. Owens, Vermillion, SD (US)

(*) Notice: Subject to any disclaimer, the term of this patent is extended or adjusted under 35 U.S.C. 154(b) by 0 days.

(21) Appl. No.: 13/289,402

(22) Filed: Nov. 4, 2011

(65) Prior Publication Data

US 2012/0049525 A1 Mar. 1, 2012

(51) Int. Cl.
*F03D 9/00* (2006.01)
(52) U.S. Cl. .............................. 290/44; 290/55
(58) Field of Classification Search ........... 290/44, 290/55
See application file for complete search history.

(56) References Cited

U.S. PATENT DOCUMENTS

| | | | |
|---|---|---|---|
| 3,876,925 A | 4/1975 | Stoeckert | |
| 6,138,781 A | 10/2000 | Hakala | |
| 6,897,575 B1 | 5/2005 | Yu | |
| 7,147,069 B2 | 12/2006 | Maberry | |
| 7,211,905 B1 | 5/2007 | McDavid | |
| 7,434,636 B2 | 10/2008 | Sutherland | |
| 7,445,064 B2 | 11/2008 | Kim | |
| 7,492,053 B2 | 2/2009 | Fein | |
| 2003/0057707 A1 | 3/2003 | Wu | |
| 2008/0041643 A1 | 2/2008 | Khalife | |
| 2008/0202825 A1 | 8/2008 | Kerish | |
| 2010/0237627 A1* | 9/2010 | Socolove et al. | 290/55 |
| 2011/0031043 A1 | 2/2011 | Armani | |
| 2011/0037261 A1* | 2/2011 | Champ et al. | 290/44 |
| 2011/0100731 A1 | 5/2011 | Hassan | |
| 2011/0156404 A1 | 6/2011 | Haddad | |
| 2012/0038159 A1* | 2/2012 | Chen et al. | 290/50 |

* cited by examiner

*Primary Examiner* — Tho D Ta
(74) *Attorney, Agent, or Firm* — Jeffrey A. Proehl; Woods, Fuller, Shultz & Smith, P.C.

(57) ABSTRACT

A system for capturing energy may comprise a vehicle having a body with an interior and an exterior, and at least one aperture being formed in the exterior through which air enters. An energy capture apparatus comprises a primary guide duct positioned in the interior with an entrance adjacent to the at least one aperture and an exit, a turbine assembly in communication with the primary guide duct to receive air flowing along the air path and having an output. The apparatus may also include a generator configured to receive rotational motion from the turbine assembly and generate electrical power, and a secondary guide duct in communication with the output of the turbine assembly. The system may comprise an air utilizing component with an exit of the secondary guide duct being positioned adjacent to the component.

17 Claims, 3 Drawing Sheets

SYSTEM FOR A VEHICLE TO CAPTURE ENERGY FROM ENVIRONMENTAL AIR MOVEMENT

BACKGROUND

Field

The present disclosure relates to vehicular energy recovery systems and more particularly pertains to a new system for a vehicle to capture energy from environmental air movement for recovering energy from the wind passing by a moving vehicle.

SUMMARY

The present disclosure relates, in some aspects, to a system for capturing energy from environmental air moving relative to a moving vehicle. The system may comprise a vehicle having a body with a front and a rear, with the body having an interior and an exterior. At least one aperture may be formed in the exterior of the body through which air enters the interior of the body. The system may comprise an energy capture apparatus for capturing energy from air being forced through the aperture by movement of the vehicle though an environmental of air. The energy capture apparatus may comprise a primary guide duct positioned in the interior of the body and having an interior in communication with the at least one aperture with the interior of the primary guide duct forming a portion of an air path. The primary guide duct has an entrance adjacent to the at least one aperture and an exit. The energy capture apparatus may also comprise a turbine assembly configured to have an input in communication with the exit of the primary guide duct to receive air flowing along the air path through the primary guide duct and form a portion of the air path. The turbine assembly may include a rotor configured to be rotated by the movement of air along the air path, with the turbine assembly having an output for exhausting air moving through the turbine assembly along the air path. The energy capture apparatus may further comprise a generator configured to receive rotational motion from the rotor of the turbine assembly and to generate electrical power from the rotational motion. The energy capture apparatus may still further comprise a secondary guide duct positioned in the interior of the body and having an interior, with the secondary guide duct having an entrance in communication with the output of the turbine assembly and an exit. The system may also include an air utilizing component positioned in the interior of the body and configured to receive and utilize environmental air, with the exit of the secondary guide duct being positioned adjacent to the component such that air moving along the air path and exiting the exit of the secondary guide duct is received by the component.

In another aspect, the disclosure relates to an energy capture apparatus for a vehicle having a body with a front and a rear, with the body having an interior and an exterior with at least one aperture being formed in the exterior of the body through which air enters the interior of the body. The vehicle may also include an air utilizing component positioned in the interior and configured to utilize air received by the component. The energy capture apparatus may comprise a primary guide duct configured for positioning in the interior of the body of the vehicle and having an interior in communication with the at least one aperture with the interior of the primary guide duct forming a portion of an air path. The primary guide duct may have an entrance adjacent to the at least one aperture and an exit. The energy capture apparatus may also comprise a turbine assembly configured for positioning in the interior of the body of the vehicle, with the turbine assembly having an input in communication with the exit of the primary guide duct to receive air flowing along the air path through the primary guide duct and form a portion of the air path. The turbine assembly may include a rotor configured to be rotated by the movement of air along the air path, and the turbine assembly may have an output for exhausting air moving through the turbine assembly along the air path. The energy capture apparatus may further comprise a generator configured for positioning in the interior of the body of the vehicle, with the generator being configured to receive rotational motion from the rotor of the turbine assembly and to generate electrical power from the rotational motion. The energy capture apparatus may also comprise a secondary guide duct configured for positioning in the interior of the body of the vehicle, with the secondary guide duct having an interior. The secondary guide duct may have an entrance in communication with the output of the turbine assembly, with the secondary guide duct having an exit configured for positioning adjacent to the air utilizing component such that air moving along the air path is received by the component.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
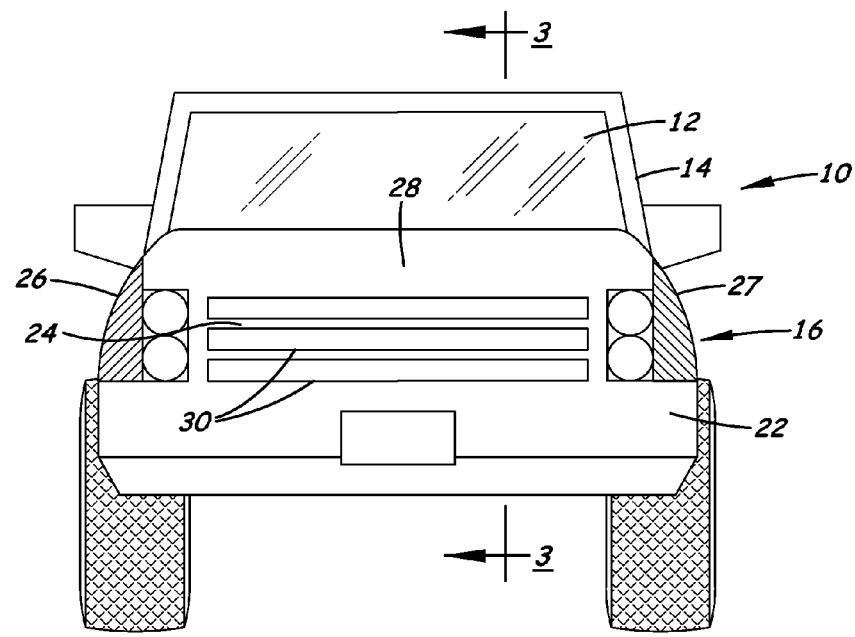
FIG. 1 is a schematic front view of a vehicle of the new system including the energy capture apparatus, according to the present disclosure.
Figure 2:
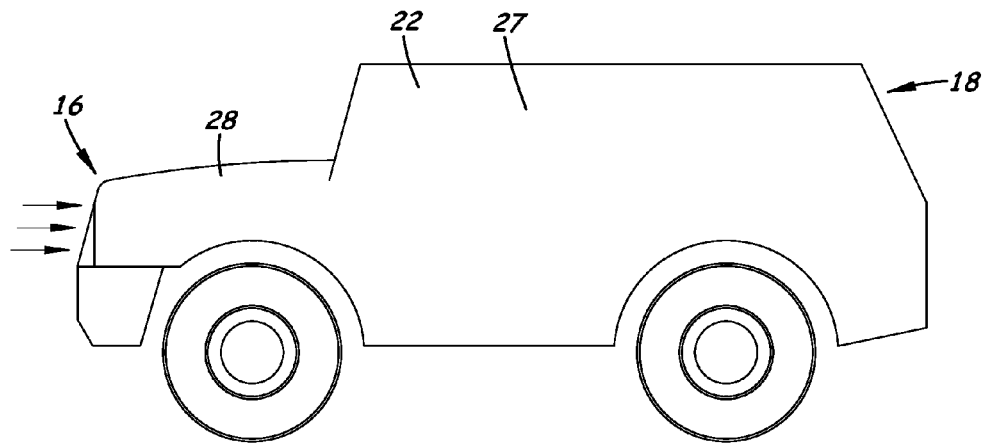
FIG. 2 is a schematic side view of the vehicle of the system, according to an illustrative embodiment.
Figure 3:
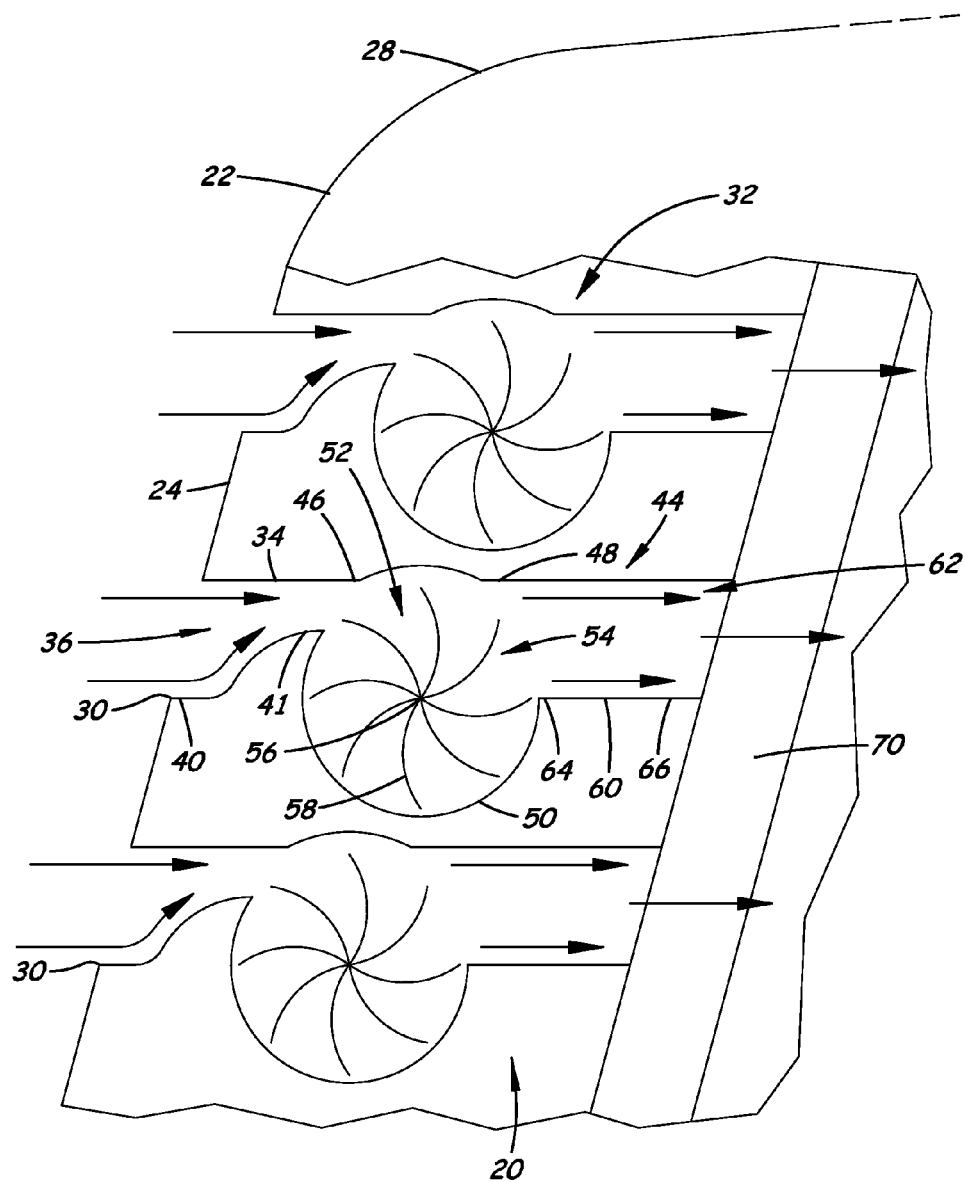
FIG. 3 is a schematic enlarged side view of the vehicle with portions of the exterior of the body removed to show detail of the energy capture apparatus, according to an illustrative embodiment.
Figure 4:
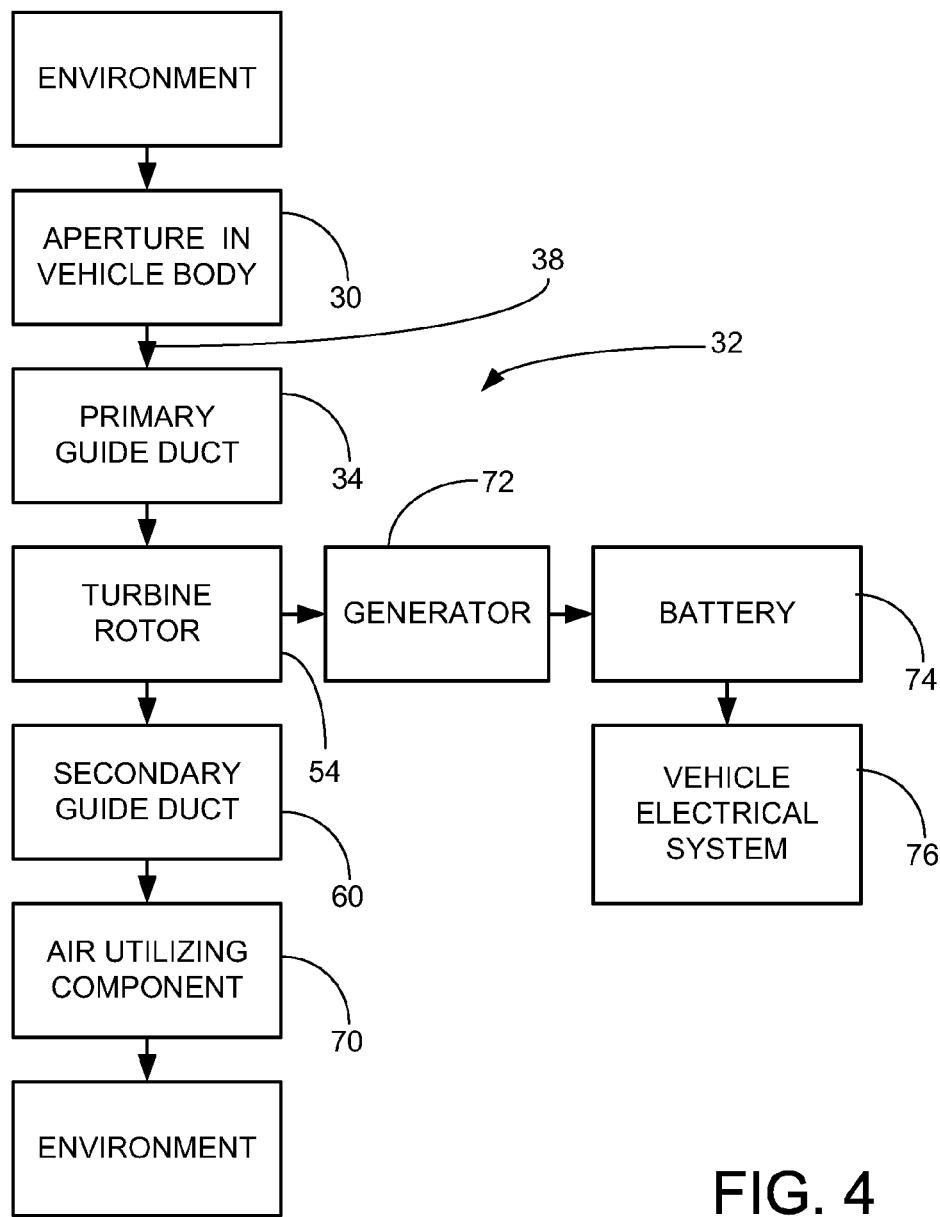
FIG. 4 is a schematic diagram of elements of the system, according to an illustrative embodiment.

With reference now to the drawings, and in particular to FIGS. 1 through 4 thereof, a new system for a vehicle to capture energy from environmental air movement embodying the principles and concepts of the disclosed subject matter will be described.

In one aspect, the disclosure relates to a system 10 for capturing energy from environmental air moving relative to a moving vehicle 12, and generally may include the vehicle and the energy capture apparatus 32. In another aspect, the disclosure relates to the energy capture apparatus 32 alone.

In general, the system 10 may comprise the vehicle 12 with the energy capture apparatus 32 being integrated into the vehicle. The vehicle 12 may have a body 14 with a front 16 and a rear 18, with the front being oriented toward the normal direction of vehicle travel and the rear being oriented away from the normal direction of vehicle travel. The body 14 may have an interior 20 and an exterior 22 with a surface that may include a front surface 24 facing a forward direction of movement. The body may also include a first side surface 26 and a second side surface 27, with the side surfaces 26, 27 extending generally rearwardly from the front surface 24 toward the rear 18. The exterior 22 may also include an upper surface 28 that may extend rearwardly from the front surface 24. The front surface 24 may be generally vertically oriented, and the side surfaces may be generally vertically oriented, while the upper surface may be generally horizontally oriented.

The body 14 has at least one aperture 30 which may be formed in the front surface 24 of the exterior to encounter a maximum amount of air when the vehicle is moving in a forward direction, which is the normal direction of travel for the vehicle. In many preferred embodiments, the aperture 30 is an inlet for air to enter the body for the purposes of cooling components of the vehicle, as will be described in greater detail below, but may also comprise, for example, an inlet for air to be used in the combustion process of a combustion engine. In many embodiments, the body 14 may have more than one aperture 30 formed therein, and more than one of the apertures may be utilized for the energy recovery purposes of the system, but not all apertures necessarily need to be utilized. The aperture or apertures 30 may form a portion of the body that is commonly referred to as the "grille" of the vehicle, and the utilization of the aperture(s) of the body grille may help to minimize the number of openings formed in the body and thereby lessen drag resistance. The aperture or apertures 30 may be elongated in shape and may form a slot, although this is not critical to the function of the system. In many implementations the slot may be elongated in the horizontal direction and along a substantially horizontal axis, although the use of apertures that are elongated in a vertical direction, or even along an inclined axis, may be utilized. The front surface 24 of a vehicle body is typically wider in a horizontal direction than a vertical direction, and thus the horizontally-elongated shape may be more useful. For the purposes of this description, aperture and slot will be used interchangeably with the understanding that the geometry is not limited to one configuration, and also that the singular also includes the plural.

The energy capture apparatus 32 may capture or recover useful energy from the air that is forced through the aperture or apertures 30 by movement of the vehicle 12 though an environment of air, such as along a road or highway. The energy capture apparatus 32 may be integrated into the vehicle, and preferably is integrated to minimize if not eliminate any protrusion from the exterior of the vehicle's body to thereby minimize any effect on the aesthetics of the vehicle as well as the aerodynamics of the vehicle. The energy capture apparatus 32 may thus be located internal to the body 14 of the vehicle, and may be located substantially completely in the interior of the body of the vehicle.

The energy capture apparatus 32 may include a primary guide duct 34 with an interior 36 that is in communication with the slot 30 and extends inwardly from the front surface 24 of the body exterior. The interior 36 of the duct primary guide 34 may form a portion of an air path 38 of the system. The primary guide duct 34 may have an entrance 40 that is located adjacent to the front surface of the exterior of the body and is in communication with the slot 30. The primary guide duct may also have an exit 41 that is located at an opposite location of the entrance 40 on the primary guide duct. The primary guide duct 34 may be oriented in a substantially horizontal orientation, although this is not critical. The interior 36 of the primary guide duct may have a cross sectional area that is measured substantially transverse to a direction of air movement along the air path, and in some embodiments, the cross sectional area of the primary guide duct 34 at the entrance 40 of the duct is greater than the cross sectional area of the duct 34 at the exit 41 to accelerate the velocity of the air moving through the duct and reaching the turbine assembly.

The energy capture apparatus may also include a turbine assembly 44 having an input 46 in communication with the primary guide duct 34 to receive air flowing along the air path 38 through the duct 34, and to thus form a portion of the air path. The turbine assembly 44 may also have an output 48 for exhausting air moving through the turbine assembly. The input 46 of the turbine assembly may be connected to the exit 41 of the primary guide duct 34.

In some embodiments, the turbine assembly 44 may comprise a housing 50 that forms the input 46 and the output 48 of the turbine assembly, and defines a housing interior 52. The housing interior 52 may be in communication with the input 46 and the output 48, as well as the exit of the primary guide duct, so that the air path 38 passes through the housing interior. The turbine assembly 44 may also comprise a rotor 54 that includes a rotatable shaft 56 rotatably mounted on the housing 50, and a plurality of blades 58 are mounted on the shaft 56 to rotate with the shaft with respect to the housing. The blades 58 are located in the housing interior 52 and are positioned to be struck by the air flowing along the air path, and to be moved by the air flowing through the housing interior. The blades may be elongated in a direction that corresponds to the elongation of the slot so that a large portion of the slot area is matched with blade surface.

The energy capture apparatus 32 may further include an energy generation structure 72 that may be connected to the turbine assembly 44, and more particularly the rotor 54 of the turbine assembly, to receive rotational energy from the rotor. The energy generation structure may include a generator that is connected to the shaft 56 of the rotor so that the armature of the generator is rotated when the rotor of the turbine assembly is rotated by the air moving along the air path and passing through by the blades 58 of the rotor. In some embodiments, a pair of generators may be connected to the rotor, with one generator located on each end of the shaft so that the blades are positioned between the generators on the shaft, which may permit the use of smaller generator form factors as compared to utilization of a single generator with each turbine assembly. The connection of the shaft of the rotor may be direct, or may be indirect through gears, belts, and the like if reduction of rotational speed is desired.

The generator may be electrically connected to a rechargeable battery 74, such as the battery of the vehicle, which may create a path of electrical communication between the energy capture apparatus 32 and the electrical system 76 of the vehicle such that the electricity generated by the apparatus 32 may be utilized by the vehicle's electrical system. Optionally, a separate battery may be associated with the apparatus 32, and the transfer of power between the apparatus 32 and the vehicle's electrical system 76 may be controlled by circuitry suitable for the purpose.

The energy capture apparatus 32 may further include a secondary guide duct 60 having an interior 62 that is in communication with the output 48 of the turbine assembly 44. The secondary guide duct 60 may have an entrance 64 located adjacent to the output 48 of the turbine assembly 44 and an exit 66 that is located opposite of the entrance 64 on the secondary guide duct. The secondary guide duct 60 may be oriented substantially horizontal, although this is not critical to the operation.

The vehicle 12 may also include a component that utilizes air from outside of the body of the vehicle. Such air utilizing components may include a cooling component design to provide heat transfer from another component. Some examples of the cooling component include a radiator that transfers heat from the engine (via a cooling fluid), and a condenser that transfers heat from the passenger compartment (via a cooling fluid or gas). Another air utilizing component may be the engine itself which receives air for combustion. Another air utilizing component may be the climate control system of the vehicle which receives and circulates air through the passenger cabin. Other air utilizing components may also exist, such as, for example, sensors for monitoring exterior environmental conditions. The illustrative embodiments of this disclosure relate to cooling components, such as the cooling component 70 that is configured to have heat drawn away from the component by the air flowing along the air path 38. The cooling component 70 may be of the type configured to have air pass through the component 70 to cause heat transfer to the air. For example, the cooling component 70 may comprise a radiator for an engine cooling system of the vehicle, or the cooling component may comprise a condenser unit of an air conditioning system of the vehicle, or both. The exit 66 of the secondary guide duct 60 may be positioned adjacent to the cooling component in the interior of the body so that air exiting the exit is directed toward and against the cooling component. In some implementations, a cooling assist fan may be positioned adjacent to the cooling component, and may also be positioned between the exit 66 of the duct 60 and the component 70. The air that moves through and/or against the component 70 may then be free to return to the environment in a normal manner, such as by exiting through the body of the body or through vents provided in the body for returning the cooling air back to the environment. Preferably, no additional vents are provided in the body of the vehicle as compared to a vehicle that does not include the energy capture apparatus, and in at least some embodiments of the invention the apparatus 32 does not require the intake into the body of more air than would be needed for conventional component purposes, although this is not critical to the invention.

Significantly, the system, and vehicles that utilize elements of the energy capture apparatus, disclosed herein is able to recover or recapture a portion of the energy contained in the wind or air moving relative to the vehicle traveling down the road. One advantage may be that this energy recovery is performed without any significant increase in the drag or wind resistance of the vehicle, such as the resistance caused by structures that protrude from the body of the vehicle to, for example, support impellers or to capture air. Such structures not only may increase the drag of the vehicle, but typically also detract from the aesthetic appearance of the vehicle. The disclosed system may avoid forming additional holes in the body of the vehicle and avoid increasing the air flowing into and through the body of the vehicle, both of which may also increase drag on the vehicle. The system utilizes air flow that is needed by (and normal routed through) the vehicle for purposes such as engine cooling and combustion so that this air flow is utilized not only for the primary purpose of cooling and/or combustion, but also for energy recovery. Thus, the system does not require additional quantities of air to be brought into the body. The same apertures or slots utilized to bring the air into the body for cooling and/or combustion may suitably be the holes that supply air to the elements of the energy capture apparatus.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for capturing energy from environmental air moving relative to a moving vehicle, the system comprising:
   a vehicle having a vehicle body with a front and a rear, the vehicle body having an interior with a motor compartment and a passenger compartment and an exterior enclosing the motor compartment and the passenger compartment, at least one aperture being formed in the exterior of the vehicle body through which air enters the interior of the vehicle body;
   an energy capture apparatus for capturing energy from air being forced through the aperture by movement of the vehicle though an environmental of air, the energy capture apparatus comprising:
      a primary guide duct positioned in the interior of the vehicle body and having an interior in communication with the at least one aperture with the interior of the primary guide duct forming a portion of an air path in the vehicle body, the primary guide duct having an entrance adjacent to the at least one aperture and an exit;

a turbine assembly positioned in the interior of the vehicle body and configured to have an input in communication with the exit of the primary guide duct to receive air flowing along the air path through the primary guide duct and form a portion of the air path, the turbine assembly including a rotor configured to be rotated by the movement of air along the air path, the turbine assembly having an output for exhausting air moving through the turbine assembly along the air path;

a generator configured to receive rotational motion from the rotor of the turbine assembly and to generate electrical power from the rotational motion;

a secondary guide duct positioned in the interior of the body and having an interior, the secondary guide duct having an entrance in communication with the output of the turbine assembly, the secondary guide duct having an exit; and an air utilizing component positioned in the interior of the body and configured to receive and utilize environmental air, the exit of the secondary guide duct being positioned adjacent to the air utilizing component such that air moving along the air path and exiting the exit of the secondary guide duct is received by the component.

2. The system of claim 1 wherein the energy capture apparatus is integrated into the interior of the body of the vehicle.

3. The system of claim 1 wherein the energy capture apparatus is located substantially completely in the interior of the body of the vehicle.

4. The system of claim 1 wherein the exterior includes a front surface facing a forward direction of movement for the vehicle, and the at least one aperture is formed in the front surface of the body.

5. The system of claim 1 the air utilizing component comprises a cooling component configured to have air pass through the cooling component such that the air path extends through the cooling component.

6. The system of claim 1 wherein the at least one aperture comprises an elongated slot.

7. The system of claim 1 wherein the air utilizing component comprises a cooling component including a radiator of a cooling system of the vehicle.

8. The system of claim 1 wherein at least two energy capture apparatus are positioned in the interior of the body.

9. The system of claim 1 wherein the motor compartment of the vehicle includes a motor comprising an internal combustion engine.

10. The system of claim 1 additionally comprising a rechargeable battery in electrical communication with the generator.

11. The system of claim 10 wherein the vehicle includes an electrical system, and the battery is in electrical communication with the electrical system.

12. An energy capture apparatus for a vehicle having a vehicle body with a front and a rear, the body having an interior with a motor compartment and a passenger compartment and an exterior enclosing the motor compartment and the passenger compartment, at least one aperture being formed in the exterior of the body through which air enters the interior of the body, the vehicle also including an air utilizing component positioned in the interior and configured to utilize air received by the component, the energy capture apparatus comprising:

a primary guide duct configured for positioning in the interior of the vehicle body and having an interior in communication with the at least one aperture with the interior of the primary guide duct forming a portion of an air path in the vehicle body, the primary guide duct having an entrance adjacent to the at least one aperture and an exit;

a turbine assembly configured for positioning in the interior of the vehicle body, the turbine assembly having an input in communication with the exit of the primary guide duct to receive air flowing along the air path through the primary guide duct and form a portion of the air path, the turbine assembly including a rotor configured to be rotated by the movement of air along the air path, the turbine assembly having an output for exhausting air moving through the turbine assembly along the air path;

a generator configured for positioning in the interior of the vehicle body, the generator being configured to receive rotational motion from the rotor of the turbine assembly and to generate electrical power from the rotational motion; and a secondary guide duct configured for positioning in the interior of the vehicle body, the secondary guide duct having an interior, the secondary guide duct having an entrance in communication with the output of the turbine assembly, the secondary guide duct having an exit configured for positioning adjacent to the air utilizing component such that air moving along the air path is received by the component.

13. The apparatus of claim 12 additionally comprising a rechargeable battery for positioning in the interior of the vehicle body and in electrical communication with the generator.

14. The apparatus of claim 12 wherein the turbine assembly comprises a housing forming the input and output of the turbine assembly, the housing defining a housing interior in communication with the input and the output of the turbine assembly; and wherein the rotor includes a rotatable shaft rotatably mounted on the housing and a plurality of blades mounted on the shaft to rotate with the shaft with respect to the housing, the blades being located in the housing interior to be moved by air flowing through the housing interior.

15. The system of claim 12 wherein the motor compartment of the vehicle includes a motor, the motor comprising an internal combustion engine.

16. A system for capturing energy from environmental air moving relative to a moving vehicle, the system comprising:

a vehicle having a vehicle body with a front and a rear, the body having an interior including a motor compartment and a passenger compartment of the vehicle, the body having an exterior enclosing the interior with the motor and passenger compartments, at least one aperture being formed in the exterior of the vehicle body through which air enters the interior of the vehicle body;

an energy capture apparatus for capturing energy from air being forced through the aperture in the vehicle body by movement of the vehicle though an environmental of air, the energy capture apparatus being positioned in the interior of the vehicle body, the energy capture apparatus comprising:

a primary guide duct positioned in the interior of the vehicle body and having an interior in communication with the at least one aperture with the interior of the primary guide duct forming a portion of an air path, the primary guide duct having an entrance adjacent to the at least one aperture and an exit;

a turbine assembly configured to have an input in communication with the exit of the primary guide duct to receive air flowing along the air path through the primary guide duct and form a portion of the air path, the turbine assembly including a rotor configured to be rotated by the movement of air along the air path, the turbine assembly having an output for exhausting air moving through the turbine assembly along the air path;

a generator configured to receive rotational motion from the rotor of the turbine assembly and to generate electrical power from the rotational motion;

a secondary guide duct positioned in the interior of the body and having an interior, the secondary guide duct having an entrance in communication with the output of the turbine assembly, the secondary guide duct having an exit; and an air utilizing component positioned in the interior of the body and configured to receive and utilize environmental air, the exit of the secondary guide duct being positioned adjacent to the air utilizing component such that air moving along the air path and exiting the exit of the secondary guide duct is received by the component.

17. The system of claim 16 wherein the motor compartment of the vehicle includes a motor, the motor comprising an internal combustion engine.

\* \* \* \* \*